US005548531A

United States Patent [19]

Shabeer

[11] Patent Number: 5,548,531

[45] Date of Patent: Aug. 20, 1996

[54] OPTICAL PROCESSING SYSTEM

[75] Inventor: Mohammed Shabeer, Glasgow, United Kingdom

[73] Assignee: British Telecommunications public limited company, London, England

[21] Appl. No.: 78,242

[22] PCT Filed: Dec. 19, 1991

[86] PCT No.: PCT/GB91/02277

§ 371 Date: Oct. 20, 1993

§ 102(e) Date: Oct. 20, 1993

[87] PCT Pub. No.: WO92/11591

PCT Pub. Date: Jul. 9, 1992

[30] Foreign Application Priority Data

Dec. 20, 1990 [GB] United Kingdom .................... 9027652

[51] Int. Cl.$^6$ ........................................ G01S 17/02

[52] U.S. Cl. ..................... 364/514 R; 359/127; 359/164; 359/180; 359/189

[58] Field of Search ............................ 364/514; 359/165, 359/127, 135, 138, 152, 164, 180, 189

[56] References Cited

U.S. PATENT DOCUMENTS

| | | | |
|---|---|---|---|
| 4,563,774 | 1/1986 | Gloge | 359/165 |
| 4,731,878 | 3/1988 | Vaidya | 359/165 |
| 4,742,572 | 5/1988 | Yokoyama | 359/165 |
| 4,783,851 | 11/1988 | Inou et al. | 359/165 |

FOREIGN PATENT DOCUMENTS

WO90/04823 5/1990 WIPO .

OTHER PUBLICATIONS

PCT Search Report, *European Patent Office,* Mar. 11, 1992.

*Primary Examiner*—Ellis B. Ramirez
*Assistant Examiner*—Thomas Peeso
*Attorney, Agent, or Firm*—Nixon & Vanderhye P.C.

[57] ABSTRACT

An optical processing and correlation system is described in which each user is assigned a unique code as its identity. When a user wishes to establish a communication link with another user, it encodes the unique identity of the latter (representing the destination address) and broadcasts to all other users. On reception, each receiver correlates its own unique address with the received signal. If the received signal has arrived at the correct destination, then the correlator output is a maximum; this is known as auto-correlation. Alternatively, if the received signal arrives at an incorrect destination, the correlator output is a minimum, known as cross-correlation. Thus, by monitoring the correlator output, desired and undesired signals can be identified by an all-optical network. Various embodiments of the invention are described. In one aspect of the optical processing arrangement of the present invention, each raw data or information data bit, is coded into one period of a code sequence according to the following rules: (a) if the data is "1", it is coded into a code sequence x. (b) If the data is "0", it is coded into a code sequence $\bar{x}$. The generated code sequences (x or $\bar{x}$) has a further coding stage. Each "1" in the sequence (x or $\bar{x}$) is translated to two bits separated by time T; for example (01) or (10). Each zero is translated into a complementary pair, that is (10) or (01), respectively, in a preferred arrangement each "1" is translated into (01) and each "0" is translated into (10). A "0" signifies no light pulse whilst a "1" signifies the presence of a light pulse. The digits of (01) or (10) are separated by the time T.

17 Claims, 17 Drawing Sheets

DATA 1101..........................................................10

CODING STAGE 1: CONVERT EVERY 1 INTO SEQUENCE X AND EVERY 0 INTO $\bar{X}$

| 1'S | 0'S |
| --- | --- |
| X:1110010 | $\bar{X}$:1101011 |

CODING STAGE 2: CONVERT EVERY 1 INTO 01 AND EVERY 0 INTO 10

X→(01) (01) (01) (10) (10) (01) (10);$\bar{X}$→(01) (01) (10) (01) (10) (01) (01)

FIG. 1 DOUBLE CODING STAGE

OPTICAL (HARDWARE) REPRESENTATION OF +1 (01) AND 0 (10)

| t | O/P |
|---|---|
| 0 | 0 |
| T | 1 |
| 2T | 0 |

| t | O/P |
|---|---|
| 0 | 0 |
| T | 0 |
| 2T | 1 |

| t | O/P |
|---|---|
| 0 | 1 |
| T | 0 |
| 2T | 0 |

| t | O/P |
|---|---|
| 0 | 0 |
| T | 1 |
| 2T | 0 |

INPUT-COUPLER-UNIT COMBINATIONS

| | INPUT | COUPLER UNIT | O/P |
|---|---|---|---|
| (a) | 01 | 01 | 010 |
| (b) | 10 | 01 | 001 |
| (c) | 01 | 10 | 100 |
| (d) | 10 | 10 | 010 |

INPUT-OUTPUT TRUTH TABLE COUPLER UNIT

OPTICAL CORRELATOR ARCHITECTURE

COUPLER STAGES (FOLLOWED BY DETECTION AMPLIFICATION)

THE TWO MATCHING CONDITIONS

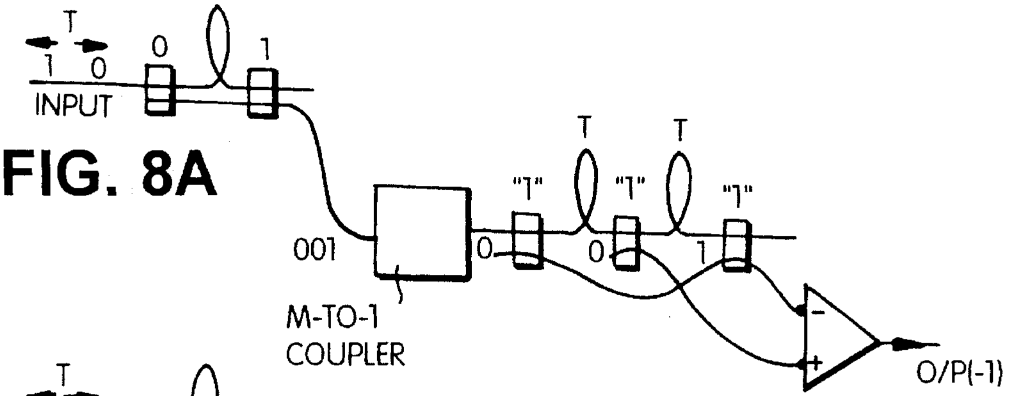
FIG. 8A
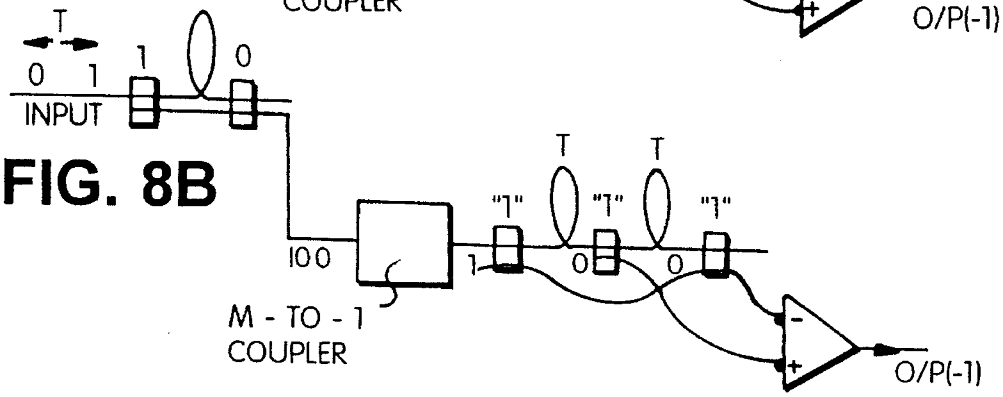
FIG. 8B
THE TWO MATCHING CONDITIONS
| INPUT | COUPLER UNIT | O/P |
|---|---|---|
| 01 | 01 | +1 |
| 10 | 01 | -1 |
| 01 | 10 | -1 |
| 10 | 10 | +1 |
TRUTH TABLE FOR THE COUPLER UNIT WITH DIFFERENTIAL AMPLIFIER
FIG. 9

OPTICAL CORRELATOR ARCHITECTURE

OPTICAL CORRELATOR ARCHITECTURE FOR RECEPTION OF 1110010

( (01) (01) (01) (10) (10) (01) (10) )

CORRELATOR ARCHITECTURES FOR RECEIVING

S = 1 1 10010 [(01) (01) (01) (10) (10) (10) (01) (10) ]

(a) INPUT= S , O/P = +7 WHEN CORRELATOR FULLY LOADED
(b) INPUT = SHIFTED VERSION OF S , O/P = -1 WHEN CORRELATOR FULLY LOADED

INPUT COUPLER COMBINATIONS

OPTICAL CORRELATOR ARCHITECTURE FOR THE RECEPTION OF 1110010 (01)(01)(01)(10)(10)(01)(10)

FIG. 20
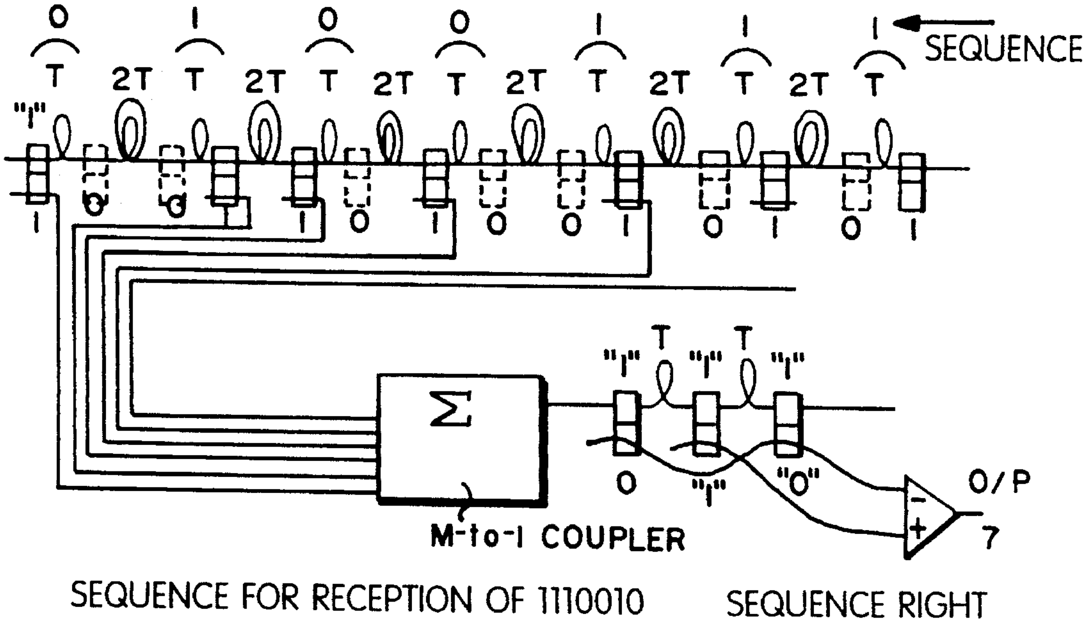
SEQUENCE FOR RECEPTION OF 1110010
SEQUENCE RIGHT TO LEFT
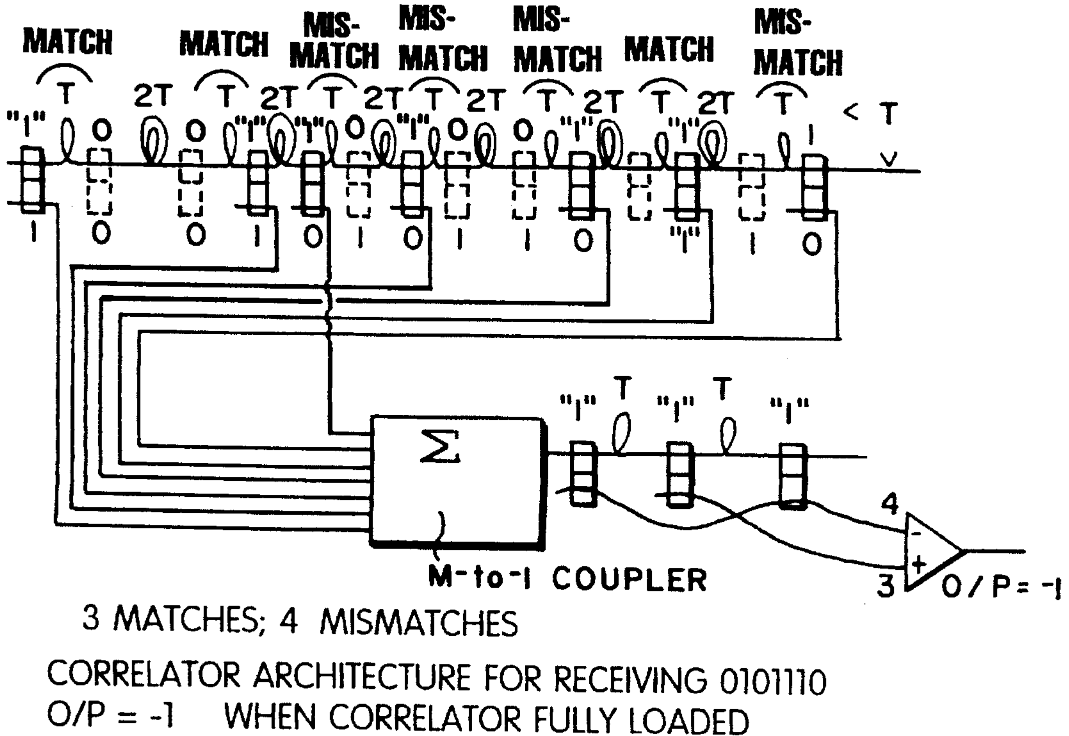
3 MATCHES; 4 MISMATCHES
CORRELATOR ARCHITECTURE FOR RECEIVING 0101110
O/P = -1 WHEN CORRELATOR FULLY LOADED
FIG. 21

FIG. 23
| | I/P | COUPLER UNIT | O/P |
|---|---|---|---|
| a) | 1(10) | 1(10) | 010 |
| b) | 1(10) | 0(01) | 001 |
| c) | 0(01) | 1(10) | 100 |
| d) | 0(01) | 0(01) | 010 |
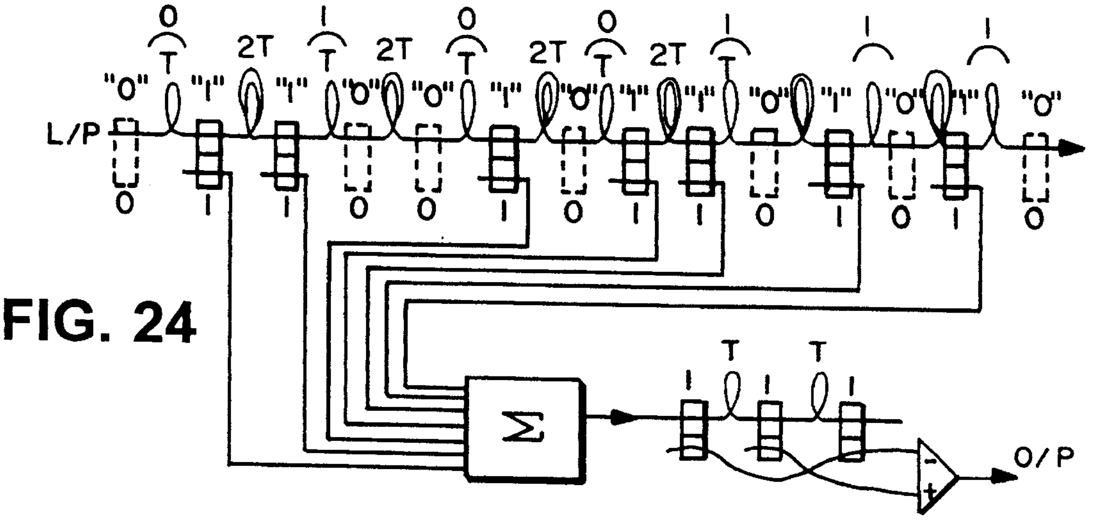
FIG. 24
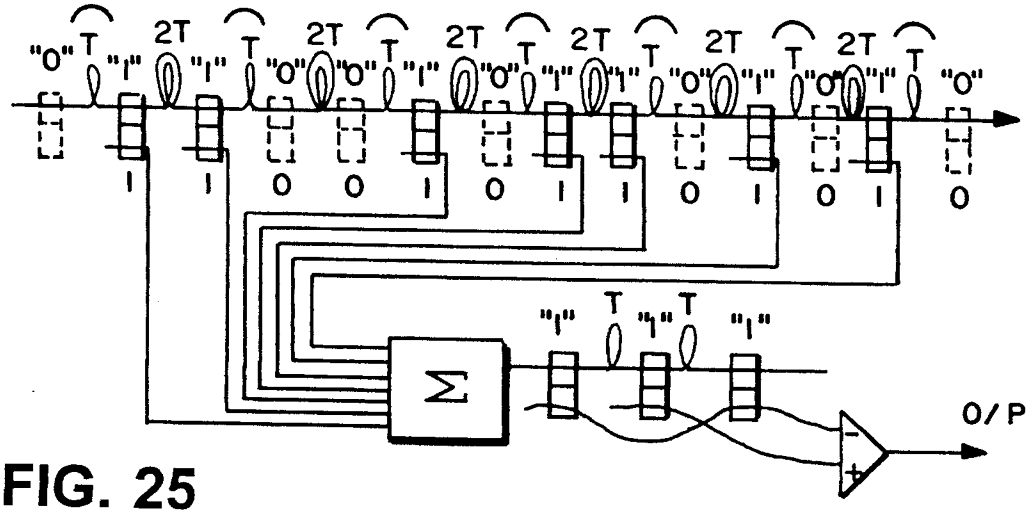
FIG. 25

FIG. 29
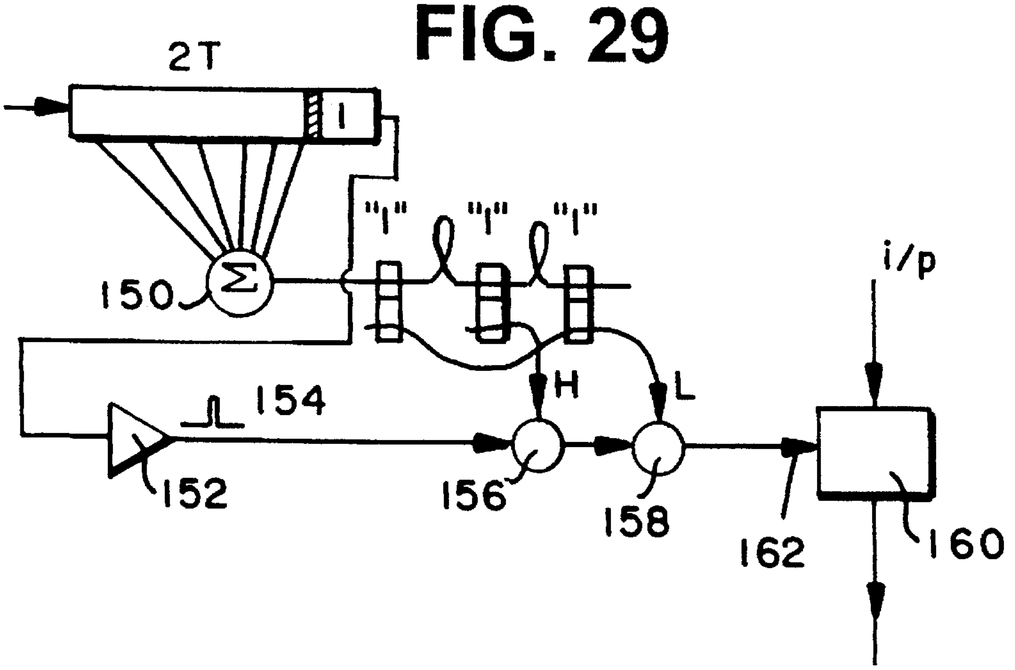
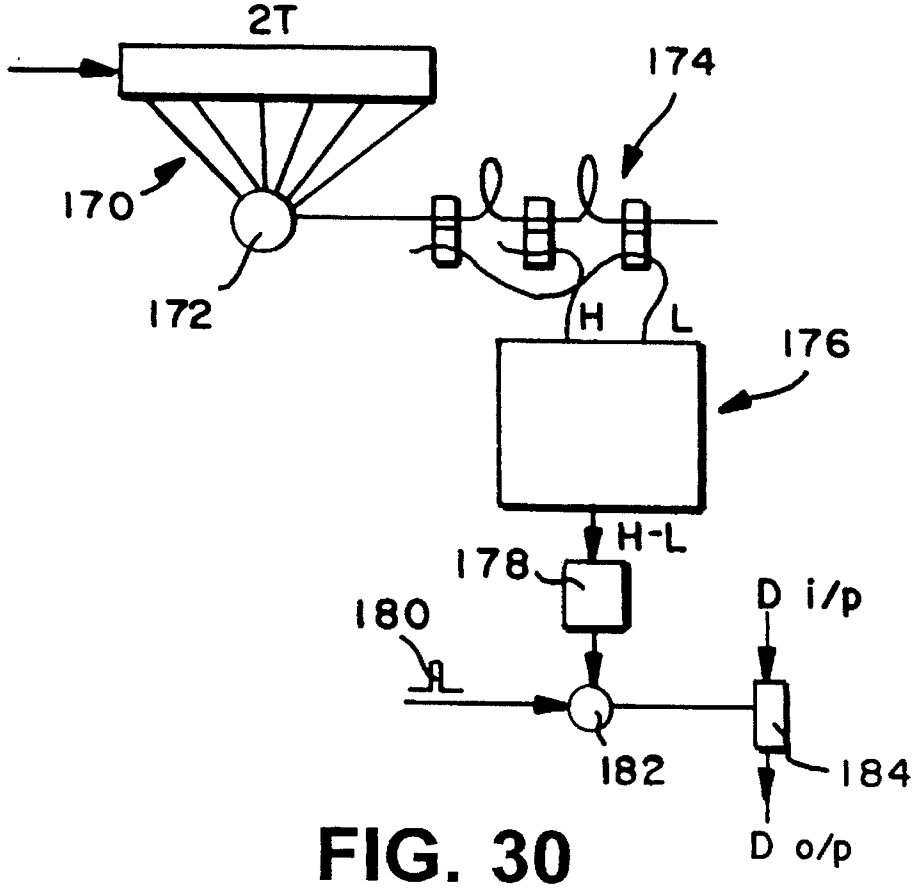
FIG. 30

FIG. 31
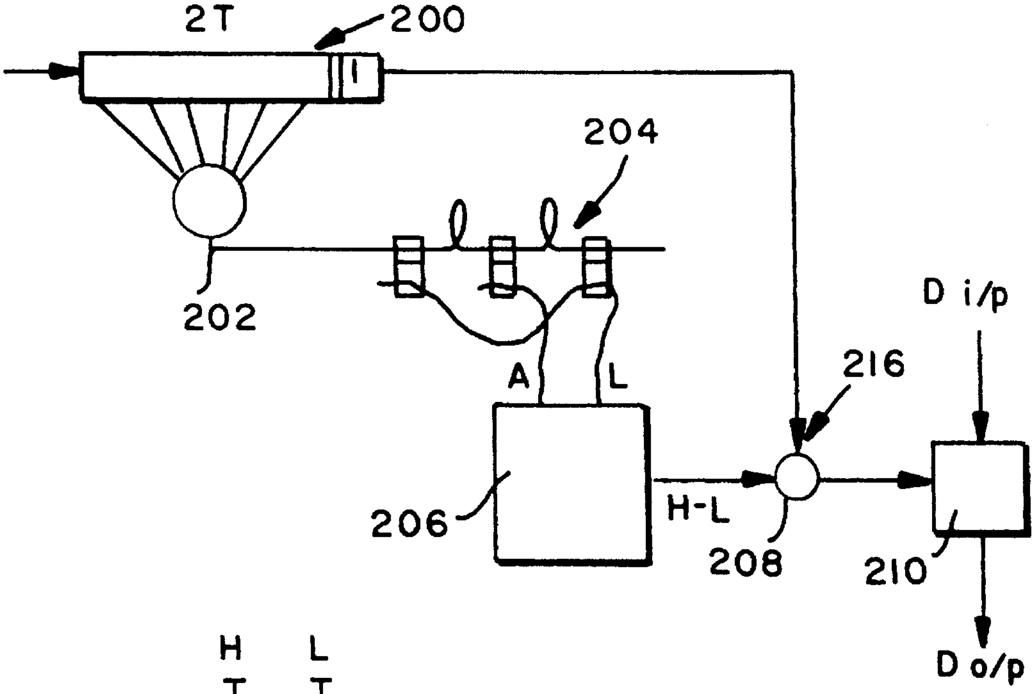
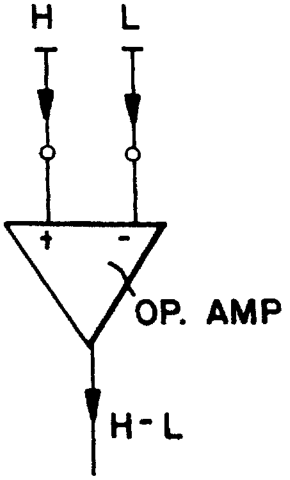
FIG. 32A
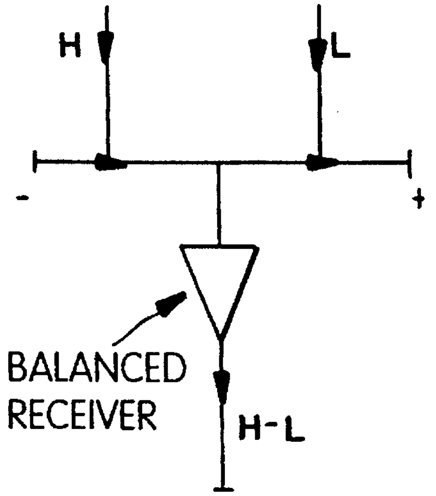
FIG. 32B
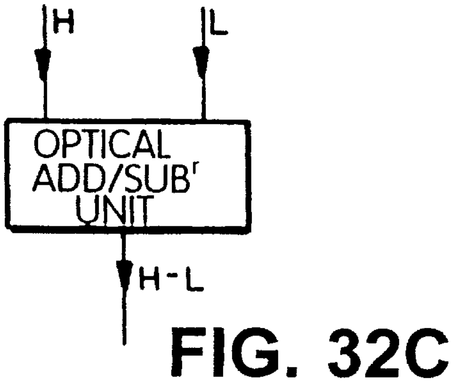
FIG. 32C

OPTICAL PROCESSING SYSTEM

The present invention relates to an optical processing system and to a method of processing optical data.

BACKGROUND OF THE INVENTION

The use of optical transmission media, such as optical fibres and integrated optics, as a high bandwidth channel, is insufficient by itself to implement high-capacity optical processing networks. The ultimate capacity of the channel will be limited by the processing speed of the associated electronics circuitry. Current stage-of-the-art electronic processing speeds are limited in the region of 1 GHz. However, optical processing methods potentially offer much higher processing throughput so that speeds may be pushed up to about 100 GHz.

Several fibre-optic networks utilising high bandwidth optical processing have been proposed recently. One such arrangement is based on an optical signal processor disclosed in international patent application Publication No. WO90/04823 in the name of the University of Strathclyde. In this arrangement, the optical signal processor and the method of processing provided a binary digit transformation so that after processing the digits, non-binary bits may be created. This required special non-standard circuitry to be manufactured to process the non-binary data. The special fabrication requirements for this circuit may limit the potential widespread use of the optical signal processor disclosed in the above publication.

SUMMARY OF THE INVENTION

An object of the present invention is to obviate or mitigate at least one of the aforementioned problems.

This is achieved by providing an optical processing and correlation system and assigning each user a unique code as its identity. When a user wishes to establish a communication link with another user, it encodes the unique identity of the latter (representing the destination address) and broadcasts to all other users. On reception, each receiver correlates its own unique address with the received signal. If the received signal has arrived at the correct destination, then the correlator output is a maximum; this is known as auto-correlation. Alternatively, if the received signal arrives at an incorrect destination, the correlator output is a minimum, known as cross-correlation. Thus, by monitoring the correlator output, desired and undesired signals can be identified by an all-optical network.

In one aspect of the optical processing arrangement of the present invention, each raw data or information data bit, is coded into one period of a code sequence according to the following rules:

(a) If the data is "1" it is coded into a code sequence x.

(b) If the data is "0", it is coded into a code sequence $\bar{x}$.

The generated code sequences (x or $\bar{x}$) have a further coding stage. Each "1" in the sequence x (or $\bar{x}$) is translated to two bits separated by time T; for example (01) or (10). Each zero is translated into a complementary pair, that is (10) or (01), respectively, in a preferred arrangement each "1" is translated into (01) and each "0" is translated into (10). An "0" signifies no light pulse whilst a "1" signifies the presence of a light pulse. The digits of 01 or (10) are separated by the time T.

A fundamental difference exists between optical processing and conventional electronic processing as regards correlater architecture. The correlator weights/taps take the values +1 and −1 in the electronic processor and +1 and 0 in the optical processor. A previously reported biopolar tap is an exception of the latter category; Fibre Optic Bipolar Tap Implementation using an Incoherent Optical Source, Shabeer et al, Optical Letters, vol. 12, page 726, 1987. Coherent processing has been reported as being possible in principle, Prucnal, P. et al, Spread Spectrum Fibre Optic Local Area Network using Optical Processing, Journal of Light Wave Technology, vol. LT-4 No 5 May 1986, and should allow +1/−1 taps to be realised but is not yet practical at present.

According to one aspect of the present invention there is provided an optical processing system for identifying when an incoming optical signal has reached its correct destination, said optical processing system comprising, data transmission means for transmitting optical signal data, data encoding means coupled to said data transmission means and to an optical transmission medium, and a data receiver coupled to said optical transmission medium, said data encoding means comprising first encoding means for encoding a binary '1' into a first code sequence and for encoding a binary '0' into a second code sequence, second encoding means for encoding each binary '1' in the first and second code sequences into a first pair of digits, and for encoding each binary zero in the first and second code sequences into a second pair of digits, the second pair of digits being the complement of the first pair of digits, the digits in each of said first and said second pair of digits being separated by time T, said data receiver having at least one optical coupling stage, the or each optical coupling stage having an optical coupler with a '1' coupling ratio, the coupling stage having a principal channel with a time delay T and a coupled channel, the location of the time delay T relative to the optical coupler determining whether the receiver is a 10 or a 01 coupling stage, each data receiver providing an output over a period of time at intervals of T and the arrangement being such that the data for optical coupling stages provides an odd number of 2N-1 outputs where N is the number of stages, and means for monitoring the value of Nth digit, to determine if the incoming signal has reached its correct destination.

Preferably each optical coupling stage has two optical couplers, one optical coupling stage having a coupling ratio of '0' and the other optical coupling stage having a coupling ratio of '1', the couplers being coupled by a principal optical channel with a time delay T between said couplers and also being coupled by a coupled optical channel.

Conveniently, said data receiver has M optical coupling stages for receiving a code sequence of M pairs of double-coded data, each optical coupling stage having an output coupled to a common M to 1 coupler unit and means for monitoring the output of the M to 1 coupler unit which is being capable of detecting a complete match, a complete mismatch or a partial mismatch of data by said data receiver.

Preferably, also said data receiver has a 3-optical coupler stage connected to the output Of the M to 1 coupler unit, each coupler in said 3-optical coupler stage having a '1' coupling ratio, the outputs of the first and third stages forming a first input to a comparator and the output of the second stage forming a second input to the comparator, the comparator having an output which can be monitored to detect received signals which are matched or mismatched, the matched signal having an amplitude of +M where M is the number of stages in the optical processor.

Preferably, the output of the M to 1 coupler unit is coupled to a receiver output processing unit which, if the correct data has been received at the receiver, controls a switch to allow the correctly identified data to be processed subsequently by the correct user.

In another aspect of the invention, a block of data, a data header, is assigned an address each '1' and '0' of which is coded by coding means into 10 or 01 as required to form a header which is then fed to the receiver output processing unit which includes gate means actuated by an external trigger and by a signal indicative of the correct header being received by the receiving stage to control a switch means to allow data following the header to be passed to the correct user. Alternatively, the trigger is derived from a pulse from a data header once the optical processing unit is filled.

Conveniently, an add-subtraction unit is incorporated in the output processing stage for determining if the correct signal has been received by the receiver, the add/subtraction unit having an output coupled to said gate means. The add/subtraction unit may be an electro-optical or an optical device.

According to another aspect of the invention, there is provided a method of processing optical data so that a desired optical signal can be correctly identified and received by a receiver, and so that undesired signals can be rejected, said method comprising the steps of, a) at a transmission location, identifying whether a data bit is a binary '1' or a binary '0';

b) if the data bit is "1", coding the bit into a first code sequence, and if the data bit is "0" coding the bit into a second code sequence different from the first code sequence;

c) coding each "1" in said first and second code sequences into a first pair of binary digits (01) or (10) and coding each "0" in said first and second code sequences into a second pair of binary digits, (10) or (01) respectively, the second pair of digits being complementary to the first pair of digits, the digits of each 01 and 10 pair being separated by time T;

d) receiving the encoded data from an optical transmission medium in at least one optical coupling stage provided by at least one optical coupler having a coupling ratio of binary '1', each optical coupler stage having a coupling value set to 01 or to 10 to provide a hardware representation of 01 or 10 coding, respectively, e) processing the output of the coupling stage to provide 2N-1 outputs each separated by time T where N is the number of coupling stages and N=2, 3, 4 and f) monitoring the Nth output for the presence of a desired digital signal, the presence of the digital signal in said Nth output above a certain preset threshold indicating a match, that is, the desired signal had been received at the correct receiving station.

Preferably, the desired digital signal is a binary 1.

Preferably, a plurality of M coupling stages are provided and the outputs in each stage are connected in parallel to an M to 1 coupler for summing the outputs to determine the degree of matching.

Preferably also, the method includes the step of processing the outnut of the M to 1 coupler in a 3-coupler stage with each coupler having a "1" coupling ratio and coupling the first and third couplers in said 3-coupler stage to a first input of a comparator, and coupling the second coupler to a second input of said comparator, said first and second inputs of said comparator being compared and providing an output signal from which the degree of matching or mismatching can be monitored.

According to another aspect of the present invention where is provided a receiver for use with an optical coupling system, said receiver comprising a plurality of optical coupling stages, each optical coupling stage having at least one optical coupler, each optical coupler being coupled by a principal channel with a time delay of T associated with the coupler of each stage and each stage being separated by a time delay of at least T, the location of the time delay T in each stage determining whether the stage is an 01 or 10 coupler, each coupler having a coupled channel connected to an M to 1 coupler for summing the outputs of all of the coupling stages to provide a combined output, the combined output determined whether the correct data has been received in the receiver.

Preferably each stage has two optical couplers, one coupler having an '0' coupling ratio and the other coupler having a '1' coupling ratio. The time delay between stages is 2T for multi-user applications.

Preferably, said data receiver has M optical coupling stages for receiving a code sequence of M pairs of double-coded data, each optical coupling stage having an output coupled to a common M to 1 coupler unit, and means for monitoring the output of the M to 1 coupler unit which is being capable of detecting a complete match, a complete mismatch or a partial mismatch of data by said data receiver.

Preferably, also said data receiver has a 3-optical coupler stage connected to the output of the M to 1 coupler unit, each coupler in said 3-coupler stage having a '1' coupling ratio, the outputs of the first and third stages forming a first input to a comparator and the output of the second stage forming a second input to the comparator, the comparator having an output which can be monitored to detect received signals which are matched or mismatched, the matched signal having an amplitude of +M where M is the number of stages in the optical processor.

Preferably, the output of the M to 1 coupler unit is coupled to a receiver output processing unit which, if the correct data has been received at the receiver, controls a switch to allow the correctly identified data to be processed subsequently by the correct user.

These and other aspects of the invention will become apparent from the following description when taken in combination with the accompanying drawings in which:

BRIEF DESCRIPTION OF THE DRAWINGS

FIG. 1 is a schematic representation of the two coding stages for converting raw data into a group of pairs for processing by the optical processing apparatus;

FIGS. 8*a* and 8*b* are similar to FIGS. 7*a* and 7*b* and show the arrangement when the outputs are mismatched;

FIG. 9 is a truth table for the arrangements in FIGS. 7*a* and 7*b* and FIGS. 8*a* and 8*b* shown in the input/coupler unit combinations;

FIG. 23 is the corresponding truth table for FIG. 22;

FIG. 24 depicts the hardware for an optical correlator similar to that shown in FIG. 11 but showing the complementary coding sequence described with reference to FIGS. 22A through 22D;

FIG. 25 depicts the optical correlator when fully loaded and corresponds to FIG. 13;

FIG. 29 depicts an alternative arrangement similar to that shown in FIG. 28;

FIG. 30 depicts an output processing arrangement for use by multiple users;

FIG. 31 depicts an alternative embodiment of a multiple users output processing arrangement similar to that shown in FIG. 30, and FIGS. 32(*a*) through (*c*) depict differential arrangements for use with the processing circuitry shown in FIGS. 30 and 31.

DESCRIPTION OF THE PREFERRED EMBODIMENT

Reference is first made to FIG. 1 of the drawings which depicts a double coding arrangement necessary to implement the optical processing technique of the present invention and to enable the optical correlators hereinafter described to work effectively. FIGS. 1 to 5 show the arrangement for use with a single user at a time. In FIG. 1 it can be seen that in coding stage 1 every binary "1" is converted into a sequence x and every binary "0" is converted into sequence $\bar{x}$. At the outset, it should be understood that sequence $\bar{x}$ is not the mathematical complement of x. It is just a convenient way to write the sequence into which the digital 0's have been encoded.

The second coding stage involves converting each binary "1" in the sequences x and $\bar{x}$ into (01) and every binary "0" in the sequences x, $\bar{x}$ into (10), as is also illustrated in FIG. 1. The 0 signifies no light pulse whilst a 1 signifies the presence of a light pulse. The digits of (01) or (10) are soDarated by time period T.

Figure 2A:
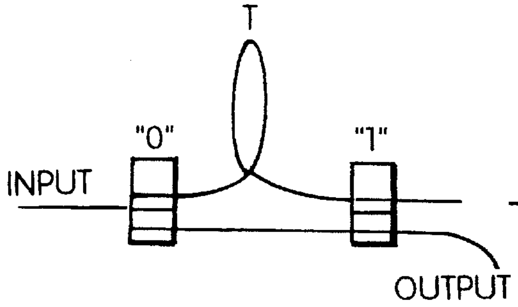
FIGS. 2A and 2B are diagramatic optical hardware representations of each 1 (01) and 0 (10) at the destination address.
Figure 2B:
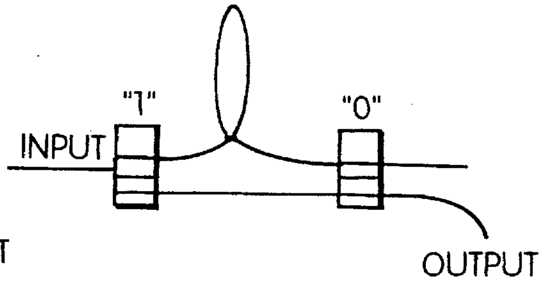
Figure 3A:
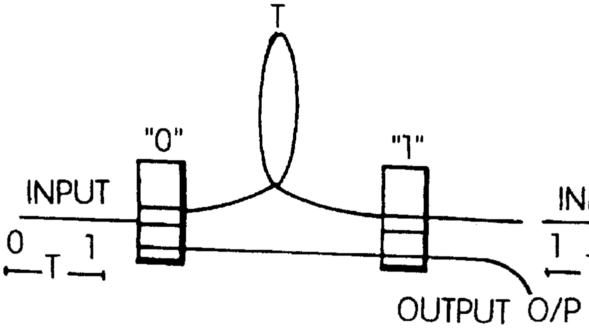
FIGS. 3*a* to *d* are Iinput-Coupler-Unit combinations for different input sequences.
Figure 3B:
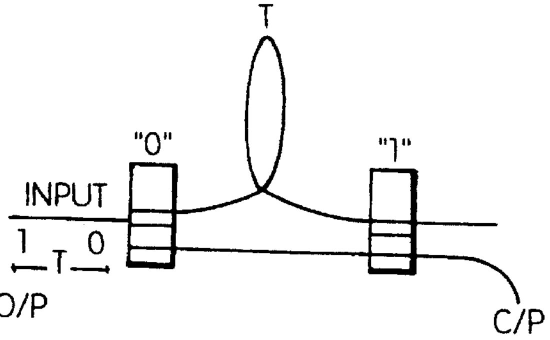
Figure 3C:
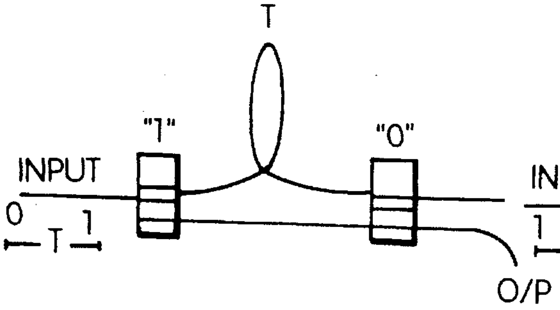
Figure 3D:
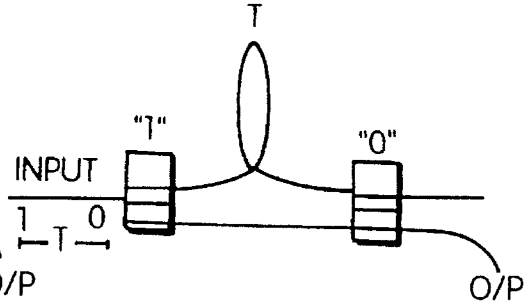

FIGS. 2A through 2B depict an optical coupler representation of +1 (01) and 0 (10) in FIGS. 2*a* and 2*b*, respectively. It will be seen that each 1 and 0 in the destination address is represented by the optical couplers shown in FIG. 2. In this case "0" corresponds to a 0% coupling ratio and "1" corresponds to, for example, a 5% coupling ratio (that is, assuming 5% of the input signal is sufficient to provide a detected output value of 1).

We shall now consider the situation when information or data consisting of (01) or (10) are received and correlated with coupler units set to receive 01 (+1) or 10 (0). The four possible situations are:

(a) The received sequence is 01 and this enters the coupler unit (+1) programmed to receive 01;

(b) The received sequence is 10 and this sequence enters the coupler unit (+1) programmed to receive 01;

(c) The received sequence is 01 and this enters the coupler unit (0) programmed to receive sequence 10, and (d) The received sequence is 10 and this enters the coupler unit (0) programmed to receive the sequence 10.

The four possible combinations (a) to (d) listed above are schematically shown in FIGS. 3*a* to *d* of the accompanying drawings are also explained with reference to FIG. 4 which is the input-output truth table for the coupler unit for various combinations (a–d) of input and coupler unit data. As can be seen from FIGS. 3*a* and 3*d* when the input sequences (01 or 10) match with the coupler arrangements, also 01 or 10, the coupler outputs are 010. For the two cases shown in FIGS. 3*b* and 3*c*, which are cases of mismatch, that is input 01, coupler set to 10 and vice versa, the coupler outputs are 100 and 001. Thus, it can be seen from the outputs shown in the truth table of FIG. 4 that only if there is a match the middle "timeslot" output is a binary 1, otherwise the output is 0.

The above description is of a single optical coupler pair, ie one stage. However, reception of a sequence transmitted data, a practical optical correlator will require M coupler stages, as shown in FIG. 5, to receive a code sequence of length M, ie M pairs of binary digits. It will be seen that the coupling stages are arranged as described in the aforementioned international publication No. WO90/04823 with the primary channel in each stage connected to successive stages, each 'stage' within the primary channel having a delay of period T. The second coupler of each stage has an output from the coupled channel which is coupled to an M to 1 coupler as shown in FIG. 5. Thus M outputs are fed to the input of the M to 1 coupler. The output of the M to 1 coupler is of particular interest and there are three possible combinations of received sequence and M-stage optical correlator, which are as follows:

(a) Total mismatch at the M to 1 coupler output between the received sequence and correlator taps.

(b) Partial mismatch at the M to 1 coupler output between the received sequence and correlator taps.

(c) A complete match between the received sequence and correlator taps.

In the case of a total mismatch (a) there is no contribution from any of the optical units/correlator taps. It should be understood that only the middle time slot is of interest. In the case of a partial mismatch, that is, (b) above, the output of the M to 1 coupler depends on the number of "matches" of 01's and 10's giving an M to 1 coupler output with an amplitude corresponding to the number of matches. In the case of a complete match between the received sequence and the optical correlator taps, (c) above, every correlator tap is matched and the M to 1 coupler output is M units in amplitude.

It should be understood that for a code sequence of M bits the output of the M to 1 coupler is only of interest when the correlater is fully loaded, that is all M optical coupler stages have received data.

The optical processor described above with reference to FIGS. 1 to 5, is suitable for single user operation at any one time.

Figure 6A:
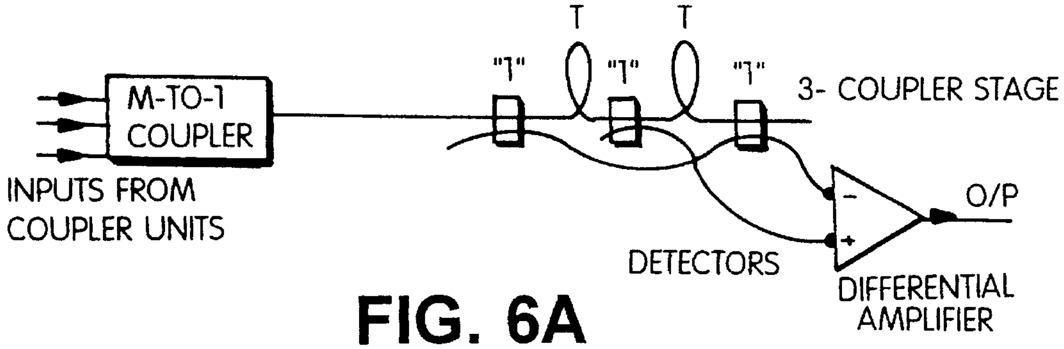
FIG. 6 *a* and *b* are schematic representations of 3-coupler stages followed by detection and amplification apparatus to permit multi-user operation.
Figure 6B:
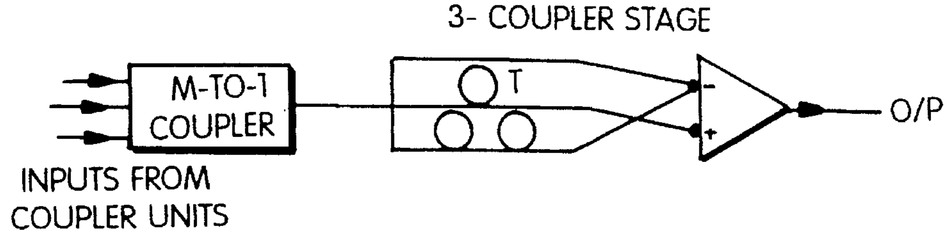

It is possible to use the optical correlator described with reference to FIGS. 1 to 5 in a modified form so that multi-user operation is possible. This is best explained with reference to FIG. 6 of the accompanying drawings. In this case, the M to 1 coupler output is passed through a further 3-coupler stage as shown in FIG. 6*a* or 6*b*. Each coupler "1" represents a certain coupling ratio which is sufficient to give a detected value of "1". The truth table shown in FIG. 4 is also applicable in this case so that (a) and (d) correspond to the situation where the received bit pair match the coupler unit, ie the middle time slot contains a binary 1.

Figure 7A:
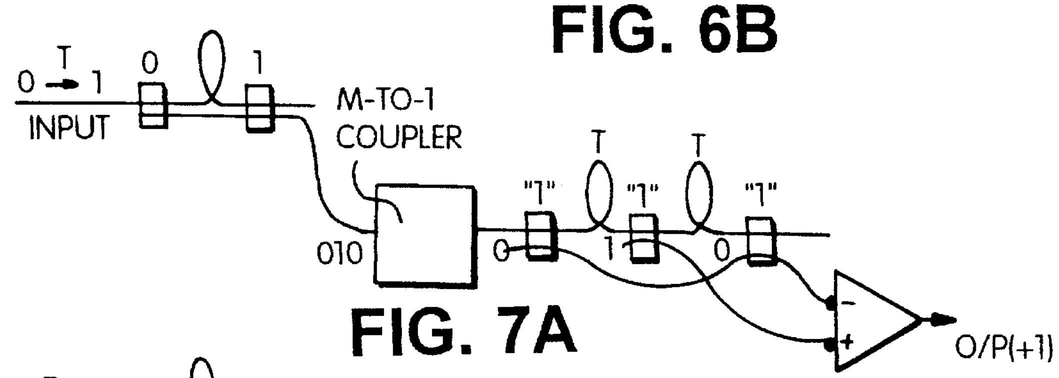
FIGS. 7*a* and 7*b* are schematic representations which depict a combination of the input/coupler unit shown in FIG. 1 with the M to 1 coupler shown in FIG. 6*a*, and depicts the two matching conditions.
Figure 7B:
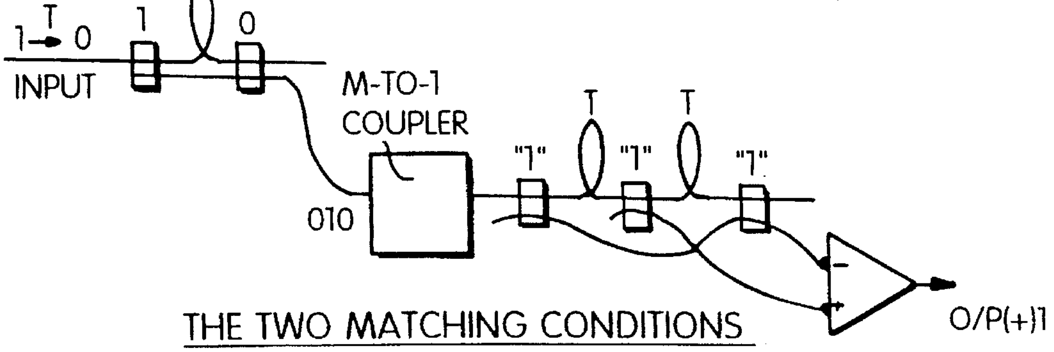

Reference is now made to FIG. 7 in (a) which shows the two input/coupler-unit combinations with M to 1 couplers connected to the output as shown in FIG. 6*a*. The output of the differential amplifier is of interest when the M to 1 coupler output is fully loaded as in the 3-coupler stage shown in FIGS. 7*a* and 7*b*. As described above, in the case of "matching", the M to 1 coupler outputs are 010. Because the middle coupler in the 3-coupler stage is fed to the positive input of the differential amplifier, the differential amplifier output is also +1.

Figures 4, 5:
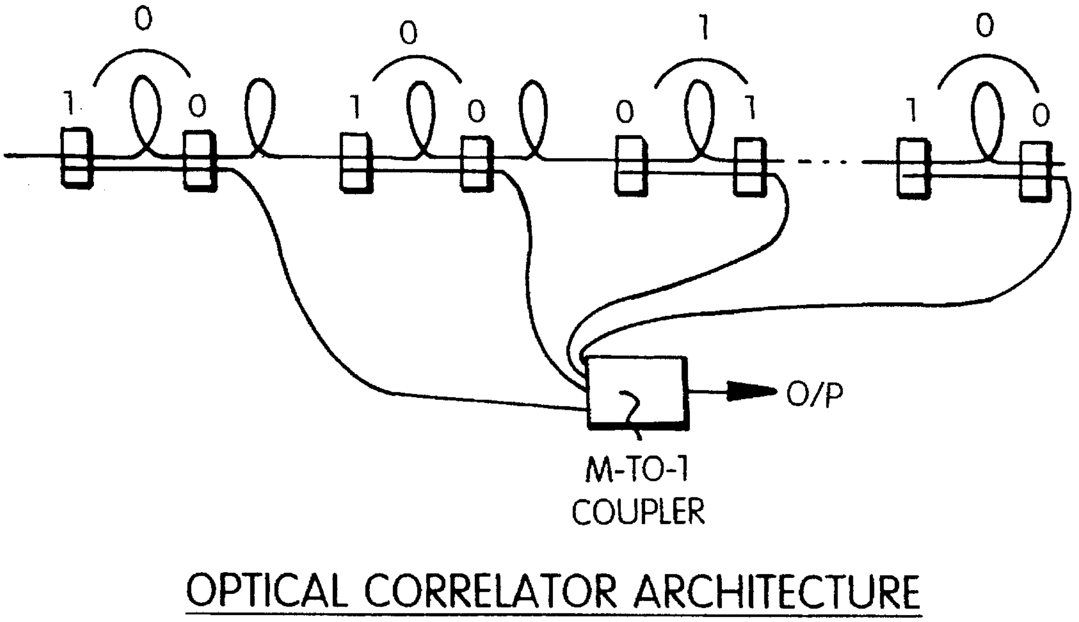
FIG. 4 is an input-output truth table for the coupler/unit combination shown in FIG. 3.
FIG. 5 is a schematic representation of the architecture of an optical correlator with M stages for receiving a code sequence having M pairs of double coded data.

In the case of a mismatch, as shown in (b) or (c) in FIG. 4 the M to 1 coupler outputs are 001 or 100 that is, the middle coupler output in the 3-coupler unit is 0 and one of the others is a 1. This set of mismatching conditions is depicted schematically in FIG. 8*a* and 8*b*. In each of these cases, the final output of differential amplifier is −1.

FIG. 9 is a truth table for the optical coupler unit with differential amplifier for the arrangements shown in FIGS. 7*a* and 7*b* and FIGS. 8*a* and 8*b*. It can thus be seen that the two outputs of the differential amplifier are only +1 when the input sequence and coupler unit sequence match.

Figure 10:
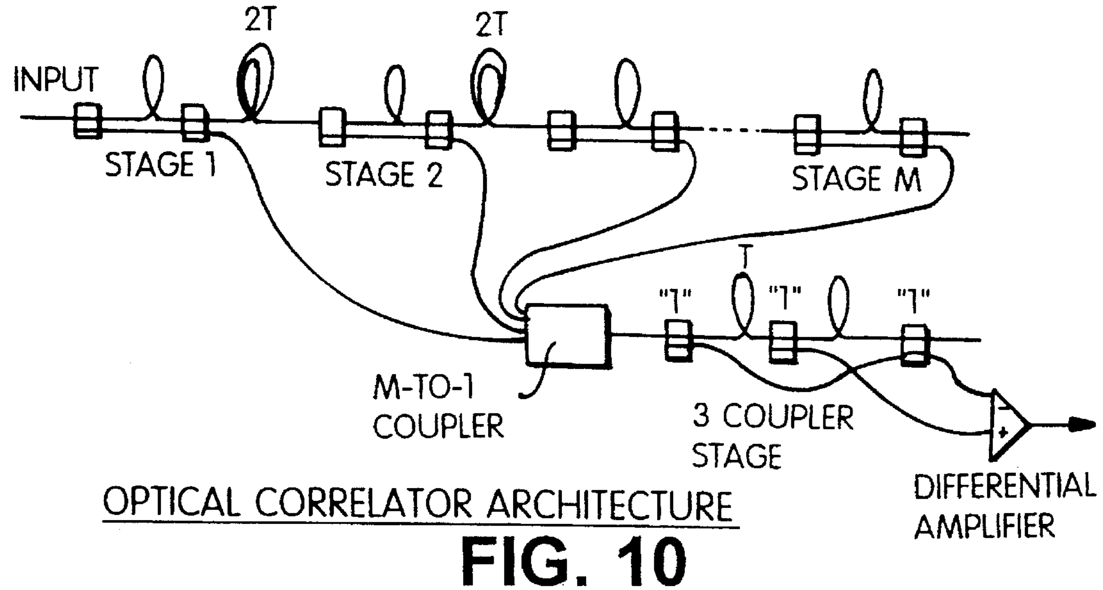
FIG. 10 is a schematic diagram of the architecture for an optical correlator with M coupler stages; having a 3-coupler unit and a differential amplifier located at the output stage.

Reference is now made to FIG. 10 of the drawings which depicts the architecture of an optical correlator having M coupler stages for receiving sequences of M pairs of bits. As described above, there are three particular situations of interest; a complete mismatch, a partial mismatch and a complete match.

For a complete mismatch, the contribution of each coupler stage is 001 or 100. In the 3-coupler stage connected to the output of the M to 1 coupler, the middle coupler contributes a binary 0 whilst the other two couplers are summed on to the negative input of the differential amplifier, thus providing an output at the differential amplifier of −M.

In the case of a partial mismatch, the differential amplifier output will depend on the number of "matches" and the number of "mismatches", and the output could be positive or negative. In the case of a complete match, the output of the differential amplifier is +M.

Although optical detection followed by differential amplification does compromise the speed advantage, nevertheless balanced receivers in the GHz range are available, ie the electronic differential amplifier.

It will be understood that the optical correlator architecture, an example of which is perhaps best shown in FIG. 10, opens up new applications, depending on the type of code used, for example, M-sequence, gold codes, complementary codes, prime codes, etc. In the case of M sequences which have some very simple but interesting properties, such as: (for code length N) the auto-correlation value (a perfect match is N) and for all other shifted versions of the code, the value is −1, that is, a mismatch. Thus, using the correlator architecture of the second version, that is, the multi-user operation, in which the output of the differential amplifier is monitored at certain time instances, the output consists of desired signals for matching and undesired signals for mismatching. The principal advantage of this arrangement is that the same channel can carry multiple users simultaneously.

Figure 11:
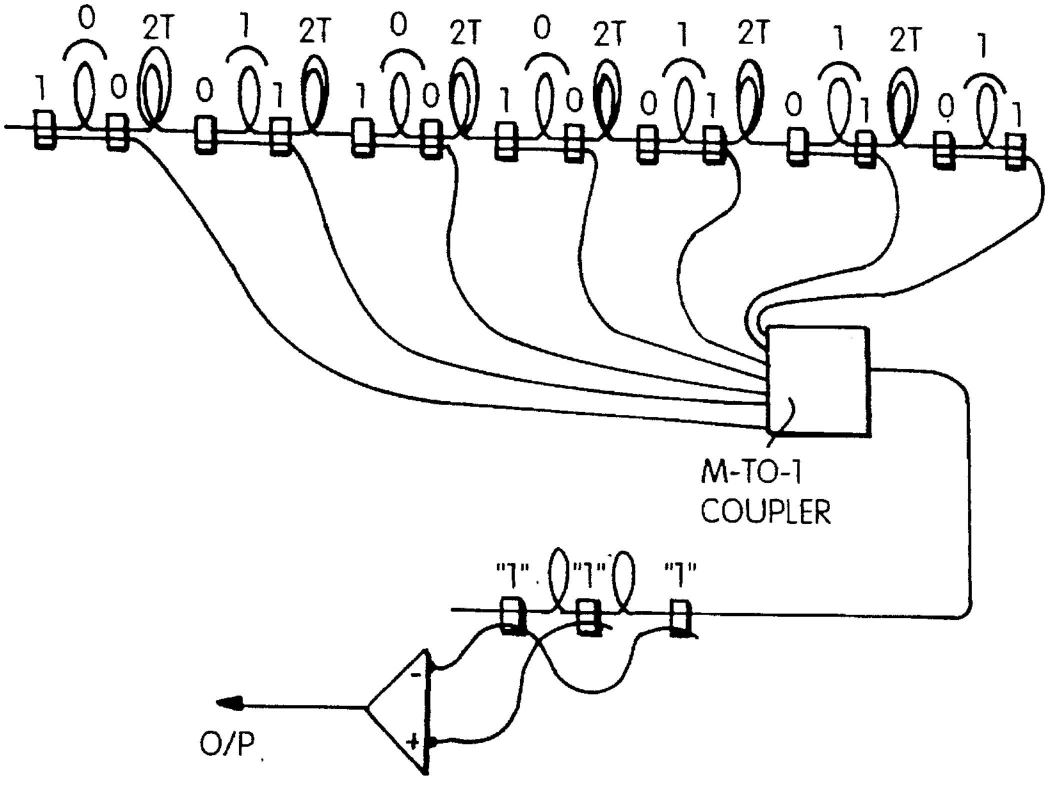
FIG. 11 shows a seven stage optical correlator based on the arrangement shown in FIG. 10 and arranged to receive a particular M-sequence.

This is best explained with reference to the following example in which a 7 digit data sequence is supplied to an optical correlator having seven stages is shown in FIG. 11.

Using the M(7)-sequence: 1110010 (desired signal) eq (1) and shifted version of this: 0101110 (undesired signal) eq (2)

1110010 (equation (1))

0101110 (equation (2))

Replacing 1's with 01's and 0's with 10's as required for the second stage of coding in the invention:

eq (1)=>01–01–01–10–10–01–10 (eq (3)

eq (2)=>(10)–(01)–(10)–(01)–(01)–(01)–(10) eq (4)

In equations (3) and (4), for multi-user examples, there is a delay of 2T necessary to prevent data overlap between adjacent (10), (01) pairs. This is represented by "–". The optical correlator of FIG. 11 is pre-programmed in the form of eq 3 above to receive the M-sequence 1110010 as shown in eq 1 above and as best depicted by inspecting the stages shown in FIG. 11. It should be understood that the correlator is always appropriately handed to the data so that it can be read when full (that is, the stages must be read from right to left in FIG. 11). The differential amplifier output of the optical correlator shown in FIG. 11 is only relevant when the received sequence of data shown in equation 3 or 4 is fully loaded in the optical correlator.

Figure 12:
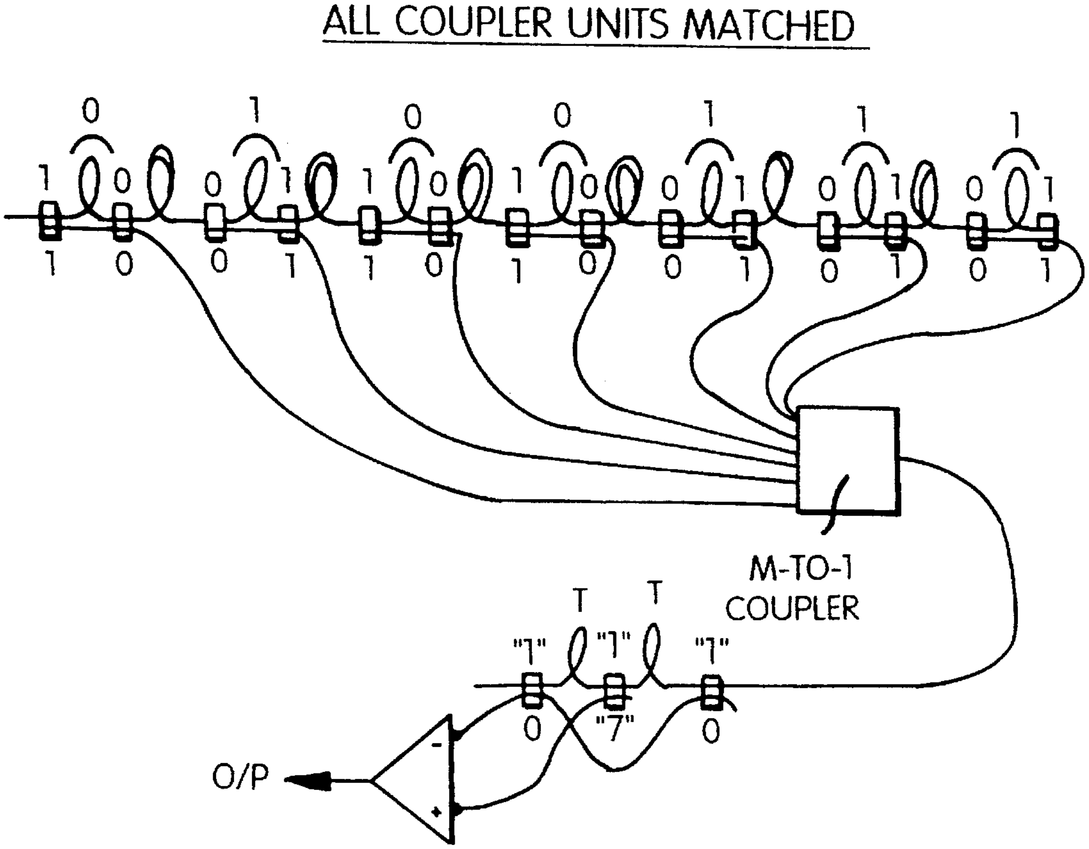
FIG. 12 depicts the optical correlator of FIG. 11 fully loaded with a complete matching sequence to provide a differential amplifier output of +7.

With reference to FIG. 12, it will be seen that the data in equation (3) is fully loaded in the optical correlator. In FIG. 12 each coupler unit is matched and 1's and 0's above the respective couplers represent preset "values" and 1's and 0's below the couplers represent the input sequence values at the instant the correlator is fully loaded. Thus, in the case of a perfect match, the output of the M to 1 coupler in FIG. 12 is 070 which, after passing through the 3-coupler stage, provides and output of +7 at the output of the differential amplifier.

Figure 13:
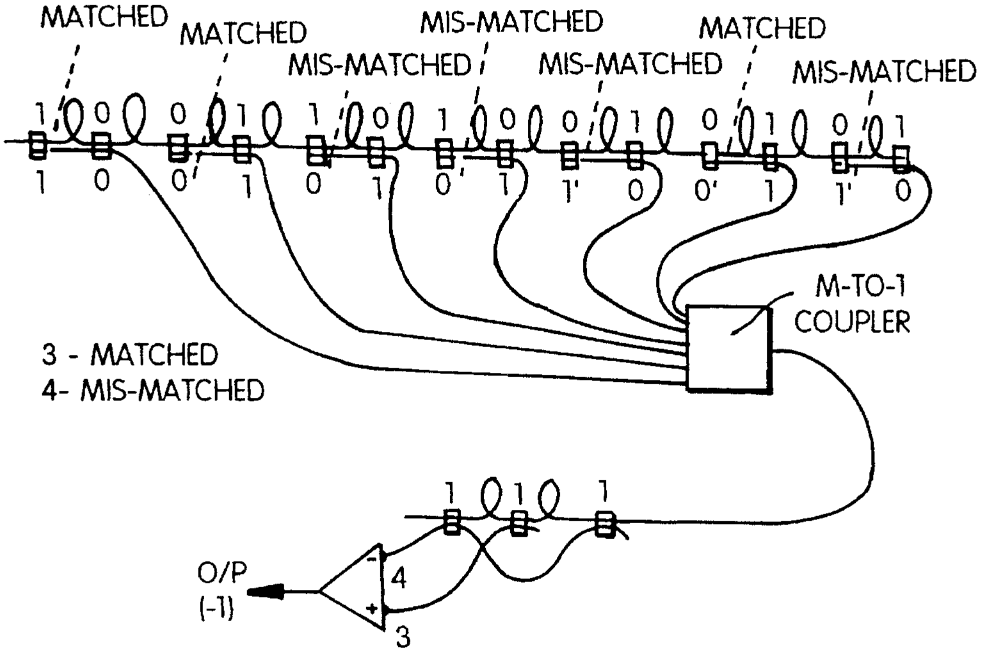
FIG. 13 depicts the optical correlator of FIG. 11 fully loaded with a different sequence so that only three coupler units match thereby providing a differential amplifier out of −1.
Figure 14A:
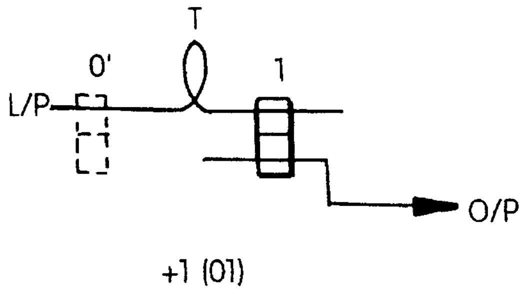
FIGS. 14A and 14B are schematic representations similar to FIG. 2 in which the zero couplers are omitted (but are represented by broken lines)
Figure 14B:
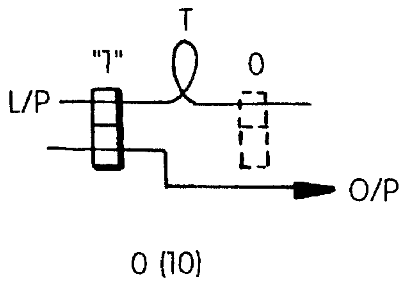
Figure 15A:
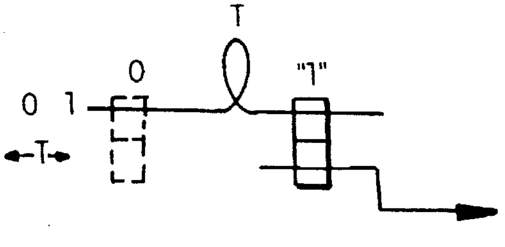
FIG. 15 (*a*) to (*d*) input coupler combinations similar to those shown in FIGS. 3(*a*) to (*d*)
Figure 15B:
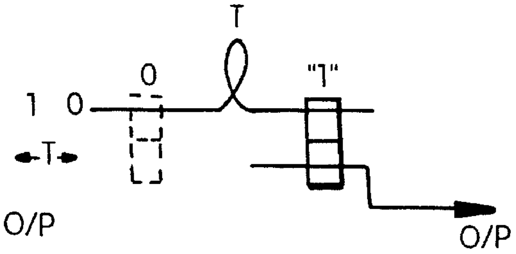
Figure 15C:
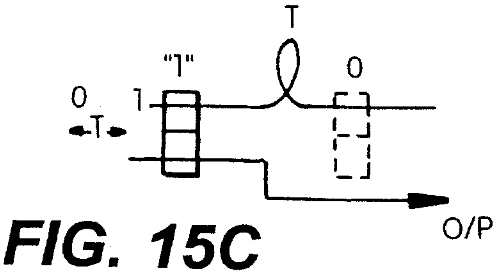
Figure 15D:
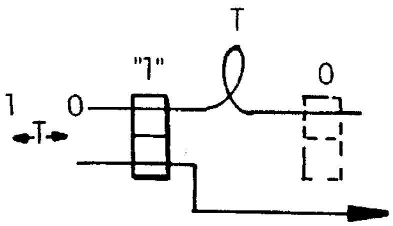
Figure 16:
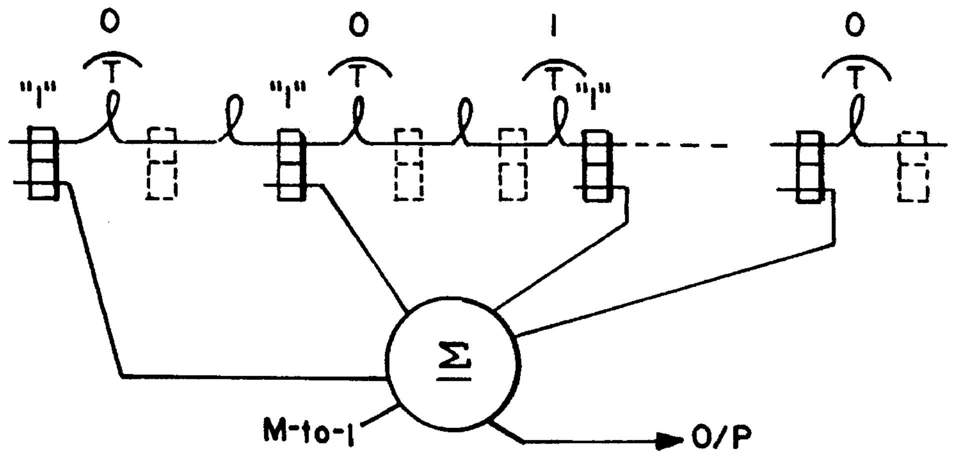
FIG. 16, 17(*a*) and (*b*), FIGS. 18A and 18B, FIG. 19, FIG. 20, and FIG. 21 correspond to FIGS. 5, 6(*a*) and (*b*), FIG. 7(*a*) and (*b*), FIG. 11, FIG. 12, and FIG. 13 respectively in which the zero couplers have been omitted, but are represented diagrammatically in broken outlines.
Figure 17A:
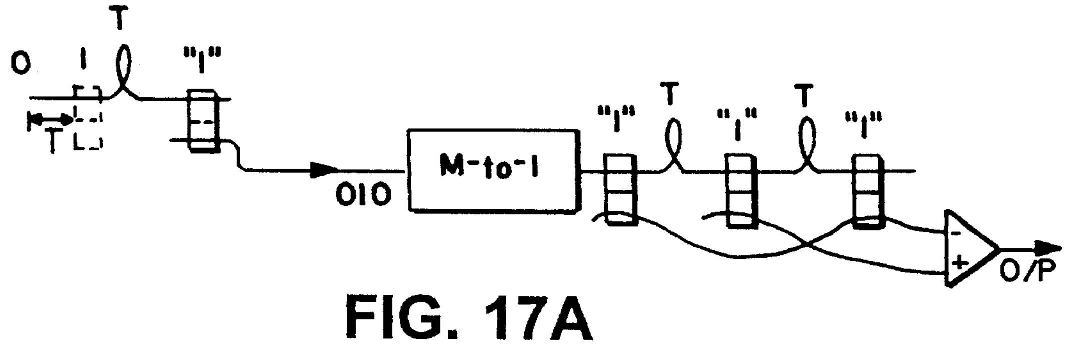
Figure 17B:
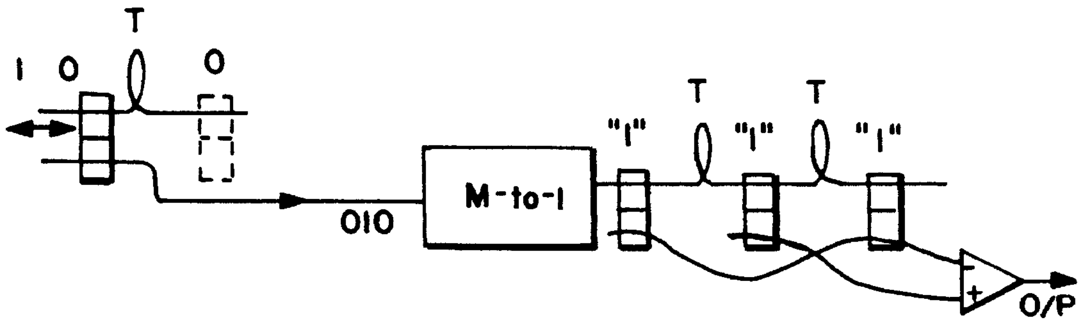
Figure 18A:
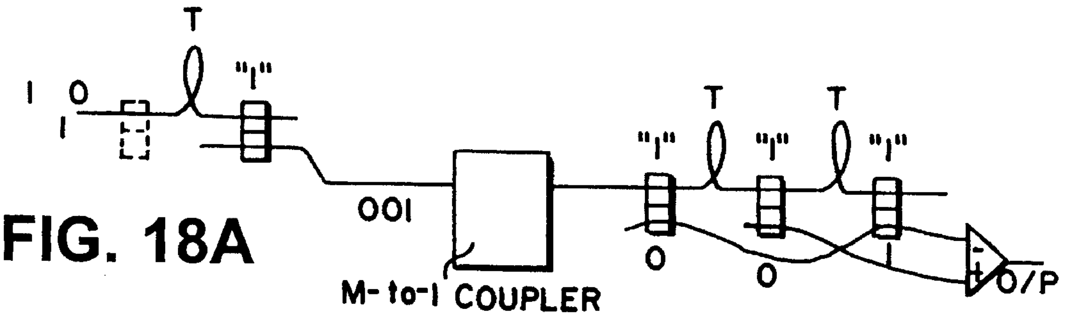
Figure 18B:
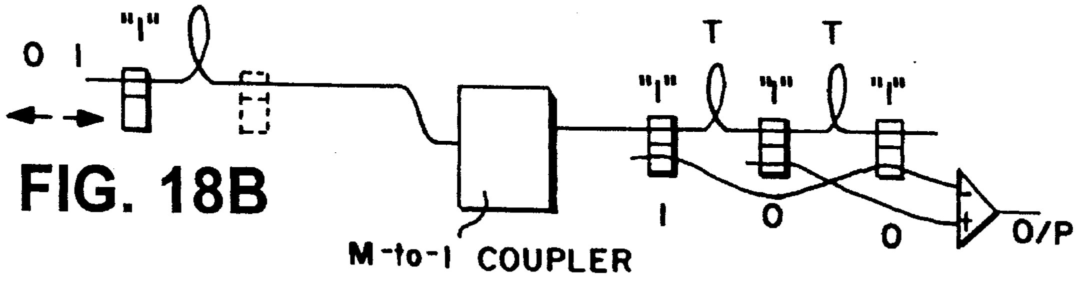
Figure 19:
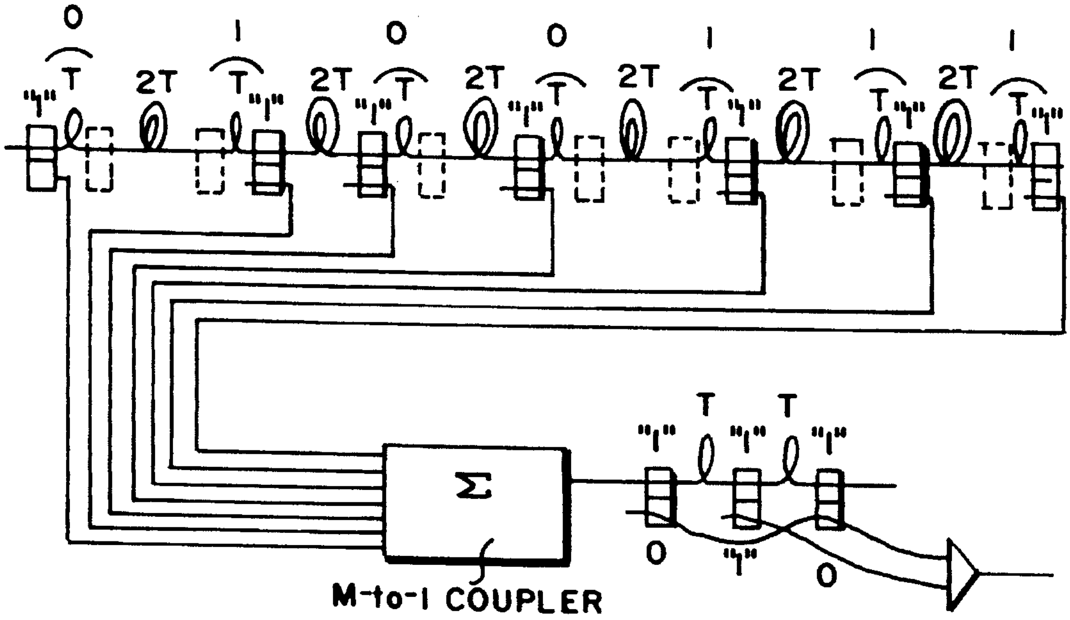
Figure 22B:
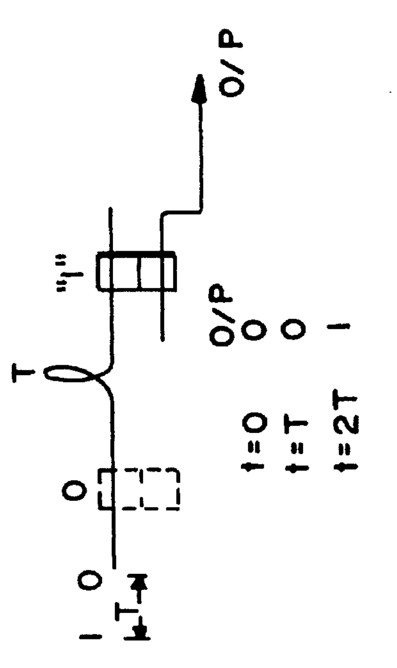
FIGS. 22 (*a*) through (*d*) are diagrammatic representations of optical hardware for a complementary coding arrangement.
Figure 22D:
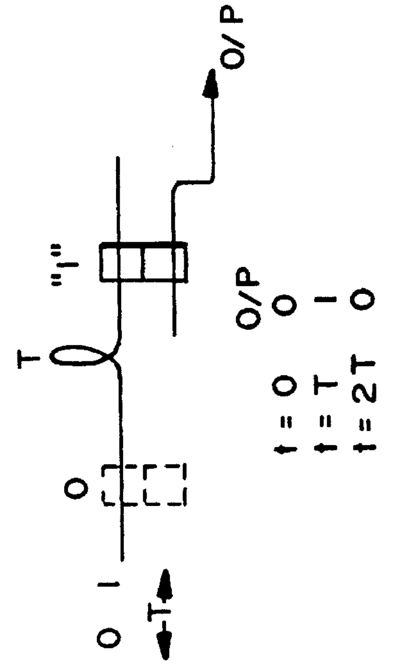
Figure 22A:
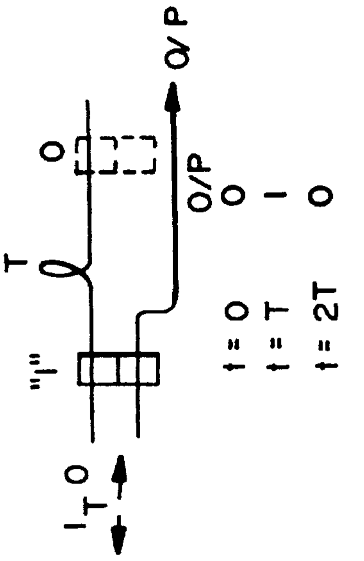
Figure 22C:
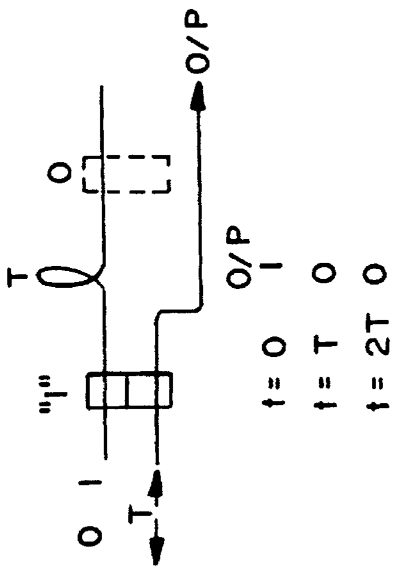

FIG. 13 depicts the same optical correlator programmed as before but having the received sequence of data shown in equation (4) fully loaded into the correlator. With this data, three optical coupler units match and four optical coupler units are mismatched, so that the output at the differential amplifier is −1 (ie, 3 matched—4 mismatched).

Thus, if the output of the optical correlators shown in FIGS. 12 and 13 are considered simultaneously, the combined differential amplifier output will be +7–1=6, that is, the desired signal minus the undesired signal.

It will be appreciated that the operating principles of a correlator architecture of optical signal processing apparatus have been hereinbefore described. The type of correlator described has applications in areas of high-speed, guided-wave communications networks and in multiplexed sensor networks. In communication applications, the high-speed multiple-access advantages are strengthened due to its compatibility with the optical fibre medium.

Reference is now made to FIGS. 14A to 21 of the drawings which correspond to some of FIGS. 1 to 13 except that the '0' coupler representing a 0% coupling ratio, has been omitted. The inclusion of the zero coupler is not strictly necessary and was included in the earlier described embodiments for ease of understanding. The position of the '0' coupler is shown by the dotted line. The corresponding arrangements referred hereto, operate in exactly the same manner and are less expensive, as the '0' couplers are not required.

It will also be appreciated that various modifications may be made to the embodiments hereinbefore decided without departing from the scope of the invention.

For example, in the second coding stage, each 1 or 0 bit can be encoded into a code with at least two digits, but with each resulting code having the same number of digits. For example, 1 may be encoded into 0001 and 0 to 1000. The two 4 bit codes overlap by 1 digit but to produce a 7-digit output and, in this case, the middle digit, ie 4th bit only is examined for matching or mismatching. This technique is applicable to codes with any number of bits although, for practical reasons such as processing speed, it is desirable that the coding be kept relatively small. Thus, two 3 bit codes produce a 5 digit output or two 5 bit codes produce a 9-digit output code, In general terms, codes of N bits create an output code 2N-1 bits in length and the Nth bit is examined for matching or mismatching.

In the embodiments hereinbefore described, the second coding stage involves:

1 being coded to 01

0 being coded to 10

It is possible to use a complementary coding arrangement wherein:

1 is coded to 10

0 is coded to 01

Thus, for 4 cases of input:

(a) 1 (10) coupler unit set to 1 (10)

(b) 1 (10) coupler unit set to 0 (01)

(c) 0 (01) coupler unit set to 1 (10)

(d) 0 (01) coupler unit set to 0 (01)

there are 4 possible outputs as can best be seen from FIGS. 22 and the corresponding truth table in FIG. 23. As in the first embodiment, a match only occurs if the middle digit is a binary '1'. Using the same M-sequence described with reference to FIG. 11 as an example: 1110010 and coding 1–>10; 0–>01 the sequence becomes (10)–(10)–(10)–(01)–(01)–(10)–(01) where (–) represents an extra 2T delay between bits for synchronisation. The hardware for the appropriate optical correlation is shown in FIG. 24. The output of the correlator is 070 when fully loaded.

For the case when the M-sequence input is a shifted version, ie 0101110 and the coupler units are set receive 1110010.

That is input –>0101110 with coding 1 –>10 0–>01 the input becomes (01)–(10)–(01)–(10)–(10)–(10)–(01) where (–) represents a 2T delay between bits. The optical correlator, when fully loaded, is shown in FIG. 25. In this case, there are 3 matches and 4 mismatches. The input is the shifted version 0101110. Thus, because there are 3 matches and 4 mismatches when fully loaded, the output is 3–4=1.

Reference is now made to FIGS. 26–32C of the accompanying drawings in which the output of the optical processing apparatus described in FIGS. 1–25 is processed to control the reception of data to a receiver (not shown). FIGS. 26–32C describe output processing units (thresholding stages) for single users and FIGS. 22 and 23 describe output processing units (thresholding stages) for multiple users.

All optical self routing of information, for example, header recognition, should also be possible thus avoiding bottlenecks associated with control electronics in current routing systems.

Figure 26:
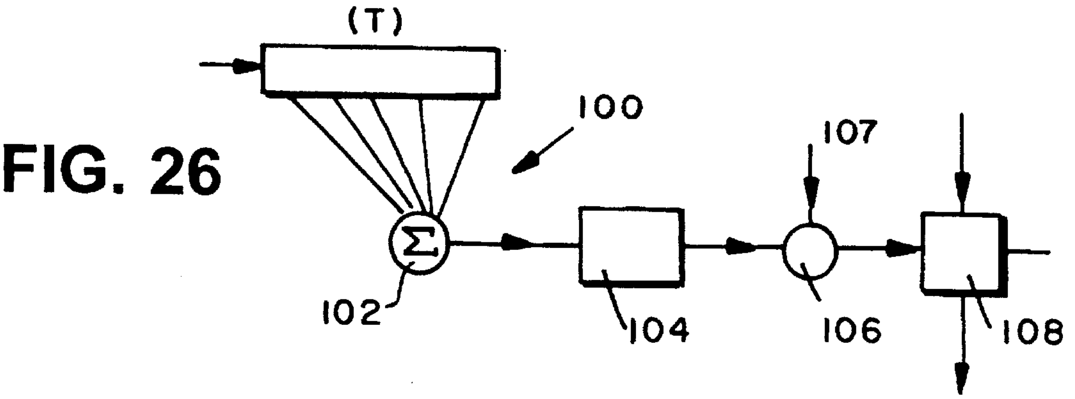
FIG. 26 depicts a correlator with output processing arrangements to control the transfer of correctly received data to a user in accordance with a further embodiment of the invention.

Reference is now made to FIG. 26 of the drawings in which optical processing apparatus generally indicated by reference numeral 100, has an output from a summation device 102 which is fed to a threshold device 104. The thresholding device is a level comparator so that only if a signal from the summation device 102 equal to a maximum, that is M, then the threshold device provides an output which is fed to AND gate 106. The AND gate 106, receives a second input from an external trigger 107 which is synchronised with the data received, that is, all of the correct data pulses have been stored in the optical signal processor whereupon the output of the AND gate is fed to a switch 108. At this particular time, the data input forms the input to the switch and on receipt of the correct output from the AND gate 106, the switch 108 is opened and the data is passed through the switch 108 to the output for subsequent processing.

If the output of a summation device 102 is less than M, then there is no output from the thresholding device 104 and, consequently the AND gate 106 does not provide an output pulse to actuate the switch 108 and consequently, the input data is not passed to the output of the switch 108.

Figure 27:
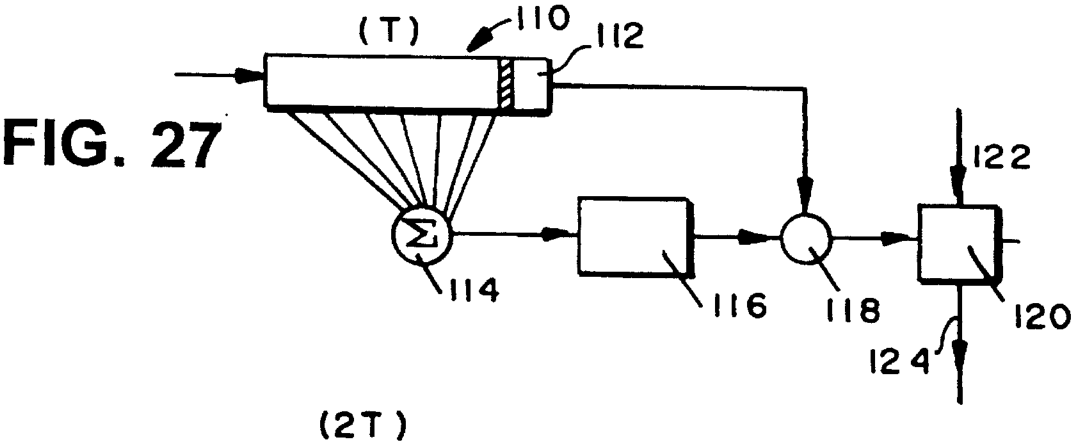
FIG. 27 depicts an alternative output processing arrangement to that shown in FIG. 26.

Reference is now made to FIG. 27 of the drawings which depicts an alternative arrangement to the output processing device shown in FIG. 26. In this case, the optical processing unit 110 has a code which is preceded by a special pulse 112. The summation device 114 is coupled to a threshold device 116 as in FIG. 26 and the output from the threshold device 116 is only provided if the pulse is of M magnitude, ie all couplers matching. The header pulse is used to provide to the AND gate 118 and the output of the AND gate 118 is fed to one input of the switch 120. The switch 120 allows the input 122 to be transferred to the output 124 for a fixed period of time and, as in FIG. 26, the input data which is fed to the input of the switch is only switched to the output 124 upon receipt of the appropriate control pulse from the AND gate 118. It should be understood that the arrangements in FIGS. 26 and 27 require a thresholding device which can handle multiple levels. In FIGS. 26, 27 the 'T' delay is the time delay between units.

Figure 28:
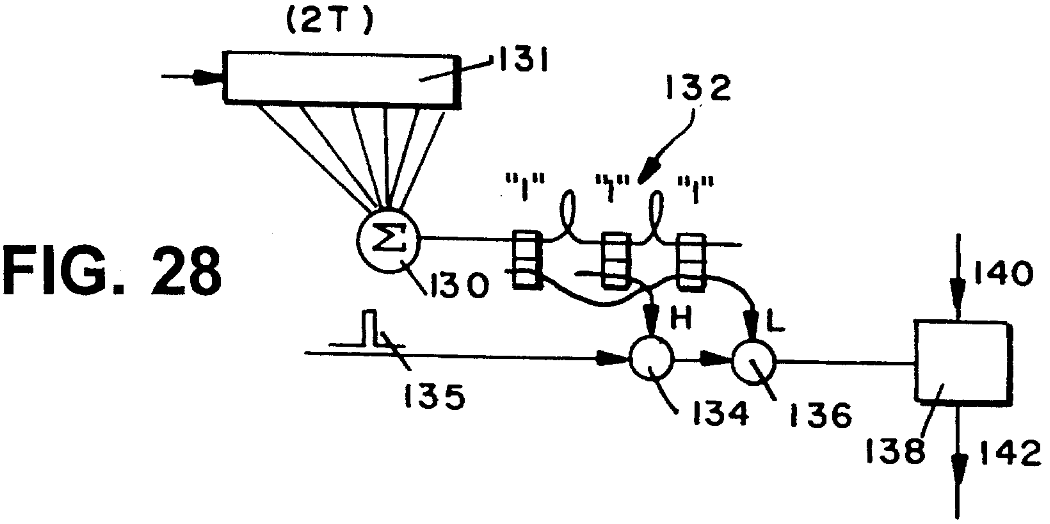
FIG. 28 depicts a further alternative arrangement of output optical processing of that shown in FIGS. 26 and 27.

Reference is not made to FIG. 28 of the drawings which shows yet another alternative arrangement to those shown in FIGS. 26 and 27. In this case, the optical processor has a summation unit 130 the output of which is passed through a three-coupler output stage, generally indicated by reference numeral 132, and which provides two outputs, H and L which are fed to the respective gates 134 and 136 which are in-line as shown. The gate 134 receives a trigger pulse input 135 which is supplied externally and the output of gate 134 is also fed to another input of gate 136. In this control circuitry, when the trigger pulse is supplied to gate 134 it will only provide an output if there is a match in all of the optical couplers in the optical processing stage and thus, an output is fed to the input of gate 136. Similarly, the gate 136 only provides a high output and allows transmission of the trigger pulse if the L input of the gate is 0. In this case, the trigger pulse is switched through to the input of switch 138 which allows information of data at the input 140 to be transferred to the output 142.

FIG. 29 depicts an alternative arrangement to that shown in FIG. 28 and in this case, a special header pulse is used as in the same manner as shown in FIG. 27. In this case, when there is an output from M from the summation device 150, the output from the centre coupling unit is a maximum. The special pulse is used to provide an input to an amplifier 152, if desired, which is used to generate a trigger pulse 154 which forms an input to the gate 156. The amplifier 152 may be omitted if required. The gate only allows the trigger pulse to pass if the other input is a logical high, ie all couplers in the optical processing unit matching and in such a case, the trigger pulse passes to the input of gate 158. AND gate 158 only allows the trigger pulse to pass if the other input is a logical low and in such a case, the trigger pulse passes to the switch 160. As described above, the switch 160 receives the data being transmitted behind the header pulse and the data is only passed to the receiver when a pulse is received at the input 162.

Reference is now made to FIG. 30 of the drawings which depicts an output processing arrangement for use by multiple users and in which an external timing trigger such as an optical pulse is used. Optical processing apparatus generally indicated by reference numeral 170, has a summation device 172, the output of which is coupled to a three-stage optical processing stage 174. The "H" and "L" outputs of the stage 174 are fed to an add/subtraction 176 and the sole function of the add/subtraction unit 176 is to provide a differential output.

The differential output (H–L) is fed to a thresholding stage 178 which only provides an output if the difference value is above a preset threshold. An external timing trigger in the form of an optical pulse 180 is fed to one input of an AND gate 182 and the AND gate only provides an output if the output of the thresholding stage is a maximum so that the timing pulse is passed to the switch 184, and only on receipt of this timing pulse does the switch 184 allow the data input to be fed to the data output for a subsequent processing by the receiver.

The add/subtraction unit 176 may be electro-optic or all optical. FIG. 32*a* shows one possibility using an electronics differential amplifier to implement the subtraction. An alternative electro-optic possibility is shown in FIG. 32*b* in which case the add/subtraction unit is implemented by a balanced receiver. FIG. 32*c* depicts an optical add and subtraction unit in which case all optical signal processing is used and AND gate 182 is also an optical gate.

Reference is now made to FIG. 31 of the drawings which is similar to FIG. 30 for a multiple user arrangement, except that a header is used to provide a trigger pulse instead of an external trigger in a similar manner as shown in FIG. 27. In this case, the optical processing apparatus is generally indicated by the reference numeral 200 as the summation unit 202, the output of which is coupled to a three-stage optical coupler generally indicated by reference numeral 204. The outputs of the optical coupler, H, L are fed to an add/subtraction unit 206 in the same fashion as that shown in FIG. 30 The output of the add/subtraction unit (H–L) is fed to one input of an AND gate 208. On the other input of the AND gate 210 receives a trigger pulse signal from the header from the optical processing apparatus. When the H–L difference is above a preset threshold and the trigger pulse is also received, the AND gate provides an output to the switch 210 and only on receipt of this pulse is the switch 210 opened to pass the data at the input to the output for subsequent processing by a receiver. In FIGS. 28 to 31 the (2T) delay shown is the spacing between couplers.

It will be appreciated that the add/subtraction unit 206 may be implemented by any of the arrangements shown in FIG. 32*a, b* and *c*.

FIG. 29 depicts an alternative arrangement to that shown in FIG. 28 and in this case a special header pulse is used as in the same manner as shown in FIG. 27. In this case, when there is an output of M from the summation device 150, the output from the centre coupling unit is a maximum. The special pulse is used to form the input to a linear operational amplifier which is used to generate a trigger pulse 154 which forms an input to the gate 156. The gate only allows the trigger pulse to pass if the other input is a logical high and, in such a case, the trigger pulse passes to the input of gate 158. AND gate 158 only allows the trigger pulse to pass if the other input is a logical low and in such a case the trigger pulse passes to the switch 160. As described above, the switch 160 receives the data being transmitted behind the header pulse and the data is only passed through the receiver when a pulse is received at the input 162.

It will be understood that, although the embodiments hereinbefore described are concerned with the serial processing of data, the principles of the invention are applicable to parallel data processing systems.

What is claimed is:

1. An optical processing system for identifying when an incoming optical signal has reached its correct destination, said optical processing system comprising, data transmission means for transmitting optical signal data, data encoding means coupled to said data transmission means and to an optical transmission medium, and a data receiver coupled to said optical transmission medium, said data encoding means comprising first encoding means for encoding a binary '1' in the data into a first code sequence and for encoding a binary '0' in the data into a second code sequence, second encoding means for encoding each binary '1' in the first and second code sequences into a first pair of digits, and for encoding each binary zero in the first and second code sequences into a second pair of digits, the second pair of digits being the complement of the first pair of digits, the digits in each of said first and said second pair of digits being separated by time T, said data receiver having at least one optical coupling stage, the or each optical coupling stage having an optical coupler with a '1' coupling ratio, the coupling stage having a principal channel with a time delay T and a coupled channel, the location of the time delay T relative to the optical coupler determining whether the receiver is a 10 or a 01 coupling stage, each data receiver providing an output over a period of time at intervals of T and the arrangement being such that the data for optical coupling stages provides an odd number of 2N-1 outputs where N is the number of stages, and means for monitoring the value of Nth digit, to determine if the incoming Signal has reached its correct destination.

2. An optical processing system as claimed in claim 1 wherein each optical coupling stage has two optical couplers, one optical coupling stage having a coupling ratio of '0' and the other optical coupling stage having a coupling ratio of '1', the couplers being coupled by a principal optical channel with a time delay T between said couplers and also being coupled by a coupled optical channel.

3. An optical processing system as claimed in claim 1 wherein said data receiver has M optical coupling stages for receiving a code sequence of M pairs of double- coded data, each optical coupling stage having an output coupled to a common M to 1 coupler unit, and means for monitoring the output of the M to 1 coupler unit which is being capable of detecting a complete match, a complete mismatch or a partial mismatch of data by said data receiver.

4. An optical processing system as claimed in claim 3 wherein said data receiver has a 3-optical coupler stage connected to the output of the M to 1 coupler unit, each coupler in said 3-optical coupler stage having a '1' coupling ratio, the outputs of the first and third stages forming a first input to a comparator and the output of the second stage forming a second input to the comparator, the comparator having an output which can be monitored to detect received signals which are matched or mismatched, the matched signal having an amplitude of +M where M is the number of stages in the optical processor.

5. An optical processing system as claimed in claim 3 wherein the output of the M to 1 coupler unit is coupled to a receiver output processing unit which, if the correct data has been received at the receiver, controls a switch to allow the correctly identified data to be processed subsequently by the correct user.

6. An optical processing system as claimed in claim 1 wherein a block of data, a data header, is assigned an address each '1' and '0' of which is coded by coding means into 10 or 01 as required to form a header which is then fed to the receiver output processing unit which includes gate means actuated by an external trigger and by a signal indicative of the correct header being received by the receiving stage to control a switch means to allow data following the header to be passed to the correct user.

7. An optical processing system as claimed in claim 5 wherein an add-subtraction unit is incorporated in the output processing stage for determining if the correct signal has been received by the receiver, the add/subtraction unit having an output coupled to said gate means.

8. An optical processing system as claimed in claim 7 wherein the add-subtraction unit is an optical or electro-optical device.

9. A method of processing optical data so that a desired optical signal can be correctly identified and received by a receiver, and so that undesired signals can be rejected, said method comprising the steps of, a) at a transmission location, identifying whether a data bit is a binary '1' or a binary '0';

b) if the data bit is "1", coding the bit into a first code sequence, and if the data bit is "0" coding the bit into a second code sequence different from the first code sequence;

c) coding each "1" in said first and second code sequences into a first pair of binary digits (01) or (10) and coding each "0" in said first and second code sequences into a second pair of binary digits, (10) or (01) respectively, the second pair of digits being complementary to the first pair of digits the digits of each 01 and 10 pair being separated by time T;

d) receiving the encoded data from an optical transmission medium in at least one optical coupling stage provided by at least one optical coupler having a coupling ratio of binary '1', each optical coupler stage having a coupling value set to 01 or to 10 to provide a hardware representation of 01 or 10 coding, respectively;

e) processing the output of the coupling stage to provide 2N-1 outputs each separated by time T where N is the number of coupling stages and N=2, 3, 4 and f) monitoring the Nth output for the presence of a desired digital signal, the presence of the digital signal in said Nth output above a certain preset threshold indicating a match, that is, the desired signal had been received at the correct receiving station.

10. A method as claimed in claim 9 wherein the desired digital signal is a binary 1, 11. A method as claimed in claim 9 wherein a plurality of M coupling stages are provided and the outputs in each stage are connected in parallel to an M to 1 coupler for summing the outputs to determine the degree of matching, 12. A method as claimed in claim 10 wherein the method includes the step of processing the output of the M to 1 coupler in a 3-coupler stage with each coupler having a "1" coupling ratio and coupling the first and third couplers in said 3-coupler stage to a first input of a comparator, and coupling the second coupler to a second input of said comparator, said first and second inputs of said comparator being compared and providing an output signal from which the degree of matching or mismatching can be monitored.

13. A receiver for use with an optical coupling system, said receiver comprising a plurality of optical coupling stages, each optical coupling stage having at least one optical coupler, each optical coupler being coupled by a principal channel with a time delay of T associated with the coupler of each stage and each stage being separated by a time delay of at least T, the location of the time delay T in each stage determining whether the stage is an 01 or 10 coupler, each coupler having a coupled channel connected to an M to 1 coupler for summing the outputs of all of the coupling stages to provide a combined output, the combined output determined whether the correct data has been received in the receiver.

14. A receiver as claimed in claim 13 wherein each stage has two optical couplers, one coupler having an '0' coupling ratio and the other coupler having a '1' coupling ratio. The time delay between stages is. 2T for multi-user applications.

15. A receiver as claimed in claim 13 wherein said data receiver has M optical coupling stages for receiving a code sequence of M pairs of double-coded data, each optical coupling stage having an output coupled to a common M to 1 coupler unit, and means for monitoring the output of the M to 1 coupler unit which is being capable of detecting a complete match, a complete mismatch or a partial mismatch of data by said data receiver.

16. A receiver as claimed in claim 13 wherein also said data receiver has a 3-optical coupler stage connected to the output of the M to 1 coupler unit, each coupler in said 3-coupler stage having a '1' coupling ratio, the outputs of the first and third stages forming a first input to a comparator and the output of the second stage forming a second input to the comparator, the comparator having an output which can be monitored to detect received signals which are matched or mismatched, the matched signal having an amplitude of +M where M is the number of stages in the optical processor.

17. A receiver as claimed in claim 13 wherein the output of the M to 1 coupler unit is coupled to a receiver output processing unit which, if the correct data has been received at the receiver, controls a switch to allow the correctly identified data to be processed subsequently by the correct user.

* * * * *